(12) United States Patent
Viswanathan et al.

(10) Patent No.: US 9,002,058 B2
(45) Date of Patent: Apr. 7, 2015

(54) SCANNED IMAGE PROJECTION SYSTEM WITH GESTURE CONTROL INPUT

(75) Inventors: P. Selvan Viswanathan, Redmond, WA (US); Mark O. Freeman, Snohomish, WA (US); Sridhar Madhavan, Redmond, WA (US); George Thomas Valliath, Winnetka, IL (US); Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 796 days.

(21) Appl. No.: 13/308,910

(22) Filed: Dec. 1, 2011

(65) Prior Publication Data

US 2013/0142383 A1 Jun. 6, 2013

(51) Int. Cl.
| | |
|---|---|
| *G06K 9/00* | (2006.01) |
| *G06F 3/03* | (2006.01) |
| *G06F 1/16* | (2006.01) |
| *G06F 3/01* | (2006.01) |
| *G06F 3/033* | (2013.01) |

(52) U.S. Cl.
CPC ............ *G06F 3/0304* (2013.01); *G06F 1/1684* (2013.01); *G06F 3/017* (2013.01)

(58) Field of Classification Search
USPC ......... 382/100, 103, 106–107, 154, 162, 168, 382/173, 181, 189, 193, 199, 209, 232, 254, 382/274, 276, 284–298, 305, 312; 715/753; 356/4.01; 345/156, 168, 166
See application file for complete search history.

(56) References Cited

U.S. PATENT DOCUMENTS

| | | | | |
|---|---|---|---|---|
| 6,281,878 | B1 * | 8/2001 | Montellese | 345/156 |
| 7,671,843 | B2 * | 3/2010 | Montellese | 345/168 |
| 7,701,439 | B2 * | 4/2010 | Hillis et al. | 345/156 |
| 8,018,579 | B1 * | 9/2011 | Krah | 356/4.01 |
| 2011/0197147 | A1 * | 8/2011 | Fai | 715/753 |

FOREIGN PATENT DOCUMENTS

GB 2466497 6/2010

* cited by examiner

*Primary Examiner* — Seyed Azarian
(74) *Attorney, Agent, or Firm* — Kevin D. Wills

(57) ABSTRACT

An imaging system (100) includes a housing (101). A control circuit (224) disposed within the housing (101). A projector (102) is disposed within the housing (101) and is operable with the control circuit (224). The projector (102) is configured to create images (104) with an image cone (106). A gesture recognition device (103) is disposed within the housing (101) and is operable with the control circuit (224). The gesture recognition device (103) is configured to detect gestures (107) in a gesture recognition cone (108). The projector (102) and the gesture recognition device (103) can be arranged within the housing (101) such that the image cone (106) and the gesture recognition cone (108) exit the housing (101) without overlap.

20 Claims, 10 Drawing Sheets

SCANNED IMAGE PROJECTION SYSTEM WITH GESTURE CONTROL INPUT

BACKGROUND

1. Technical Field

This invention relates generally to image projection systems, and more particularly to methods and apparatuses for controlling image projection systems.

2. Background Art

With traditional image projection systems, to control the image, the presenter must use a control device that is tethered to the image projection system, such as a mouse or keypad. This "hard wire" restriction limits the mobility of the presenter while making a presentation.

It would be advantageous to have an image projection system with the ability to control the image projection system without the need of a mouse or keyboard.

Figure 1:
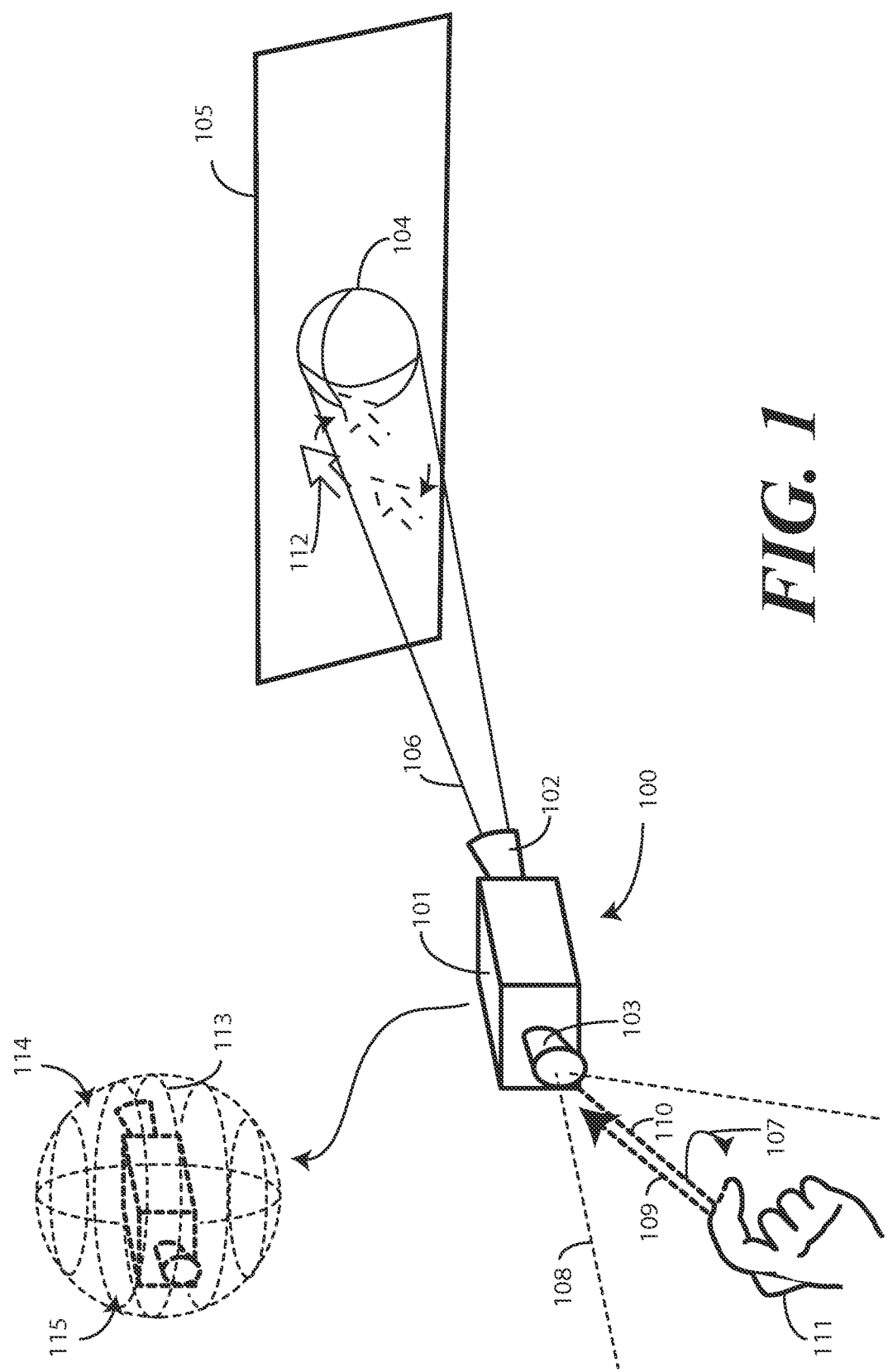
FIG. 1 illustrates one embodiment of a scanned image projection system having gesture recognition capabilities in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it will be appreciated that embodiments of the invention described herein may be comprised of one or more conventional processors and unique stored program instructions that control the one or more processors to implement, in conjunction with certain non-processor circuits, some, most, or all of the functions of permitting a user to control image content from an imaging system as described herein.

The non-processor circuits may include, but are not limited to, programmable logic, scanning mirrors, image encoding devices, memory devices, clock circuits, power circuits, and so forth. As such, these functions may be interpreted as steps of a method to perform image projection system control. It is expected that one of ordinary skill, notwithstanding possibly significant effort and many design choices motivated by, for example, available time, current technology, and economic considerations, when guided by the concepts and principles disclosed herein will be readily capable of generating such programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the invention provide an imaging system having a projector and a gesture recognition device disposed within a housing. The projector is configured to create images with an image cone. The gesture recognition device is configured to emit a gesture recognition cone. A sensor of the gesture recognition device then detects reflections, emissive patterns, or dispersive patterns of the gesture recognition cone. When a user makes specified motions, or "gestures," within the gesture recognition cone, the sensor can detect the reflections from the user. A control circuit receives signals corresponding to the gestures from the gesture recognition device and can use these signals to control content created with the image cone. In one embodiment, the gesture recognition cone and the image cone are configured to exit the housing in different hemisphere housings. For example, the image cone may exit the front of the housing, while the gesture recognition cone exits the rear. In such an embodiment, the image cone and the gesture recognition cone exit the housing without overlap. Such an embodiment solves the problem of standing behind a projector but needing to control the projected image coming out the other side.

In one or more embodiments, the gesture recognition cone can be selectively redirected. Accordingly, the "gaze" or field of view of the gesture recognition cone is steerable and can sweep a predetermined gesture recognition scanning range looking for a user desiring to control the imaging device. In one or more embodiments, the user can "call" the gaze of the gesture recognition cone by making a calling gesture. Examples of calling gestures include placing a hand on top of a head, standing on one leg, whistling, and so forth. Others will be obvious to those of ordinary skill in the art having the benefit of this disclosure.

In one or more embodiments, multiple gesture recognition cones can be emitted by multiple gesture recognition devices. These gesture recognition cones may be non-overlapping and may allow for two gesture inputs. For instance, two users playing a game can use the two gesture inputs to control the characters of the game that are presented on a projection surface by the image cone. In another embodiment configured for multiple users, rather than employing multiple gesture recognition cones, a single gesture recognition cone may turn back and forth between multiple users. A user can then stop the gesture recognition cone by executing a calling gesture that calls the gesture recognition cone to a particular location.

In one or more embodiments, the gesture recognition cone is scalable in area. Accordingly, when a calling gesture is identified, in one embodiment the gesture recognition device will narrow its field of view about the user making the calling gesture. However, while scanning or otherwise waiting for control input, the gesture recognition cone can be larger. Further, in one or more embodiments, the resolution of the gesture recognition cone can change as well. For instance, while scanning the gesture recognition may have a low resolution. However, when a calling gesture is made, the gesture recognition device may increase the resolution to detect additional gestures from the user. This change in resolution can be accomplished in addition to altering the gesture recognition cone, or optionally as an alternative to altering the area of the gesture recognition cone.

In one or more embodiments, the gesture recognition cone is created with non-visible light, such as infrared light. Since the image cone is visible light, the use of non-visible light allows the gesture recognition cone to be used to control the imaging system without interfering with image visibility. In such an embodiment, reflections from this non-visible light, such as reflections from a user's hand, can be detected by the sensor of the gesture recognition device and used as a control input. The reflections can be used, for example, to move a cursor or other content within the image. Embodiments of the present invention thus provide a method of controlling the image content that does not require a hard-wired mouse or keyboard. By passing a hand or other object within the gesture recognition cone, a user can cause reflections to be directed from the object back to the sensor of the gesture recognition device. These reflections can be used as an input, such as to control a cursor or other image contents. The sensor can be configured, in conjunction with a processor or other control circuit, to recognize hand gestures or other motion to affect the image content.

Turning now to FIG. 1, illustrated therein is one explanatory imaging system 100 configured in accordance with one or more embodiments of the invention. In this embodiment, the components of the imaging system 100 are all disposed within a unitary housing 101. A projector 102 is disposed in the housing 101. A gesture recognition device 103 is also disposed in the housing 101. A control circuit (not shown in FIG. 1) disposed within the housing 101 is operable with both the projector 102 and the gesture recognition device 103.

The projector 102 is configured to create images 104 on a projection surface 105 with an image cone 106. The gesture recognition device 103 is configured to detect gestures 107 in a gesture recognition cone 108. In one embodiment, the gesture recognition cone 108 is formed from scanned, non-visible light. Reflections 109 from portions 110 of the gesture recognition cone 108 can be detected and identified by the gesture recognition device 103. In the explanatory embodiment of FIG. 1, a user is passing his hand 111 within the gesture recognition cone 108. Portions 110 of the gesture recognition cone 108 are reflected 109 back to the gesture recognition device 103 and are identified as control input gestures. In this example, the control input gestures are being used to control movement of a cursor 112 on the projection surface 105.

In one or more embodiments, the image cone 106 and the gesture recognition cone 108 are configured to be non-overlapping. The projector 102 and gesture recognition device 103 can be arranged within the housing 101 such that the image cone 106 and the gesture recognition cone 108 come out different sides of the housing 101, for example. In the explanatory embodiment of FIG. 1, the image cone and gesture recognition cone 108 are coming out of opposite ends of the housing 101. If a reference sphere 113 is defined about the housing 101, the image cone 106 is being emitted in a first housing hemisphere 114, while the gesture recognition cone 108 is being emitted from a different, second housing hemisphere 115. Accordingly, the image cone 106 and the gesture recognition cone 108 exit the housing 101 in different housing hemispheres in this embodiment.

Figure 2:
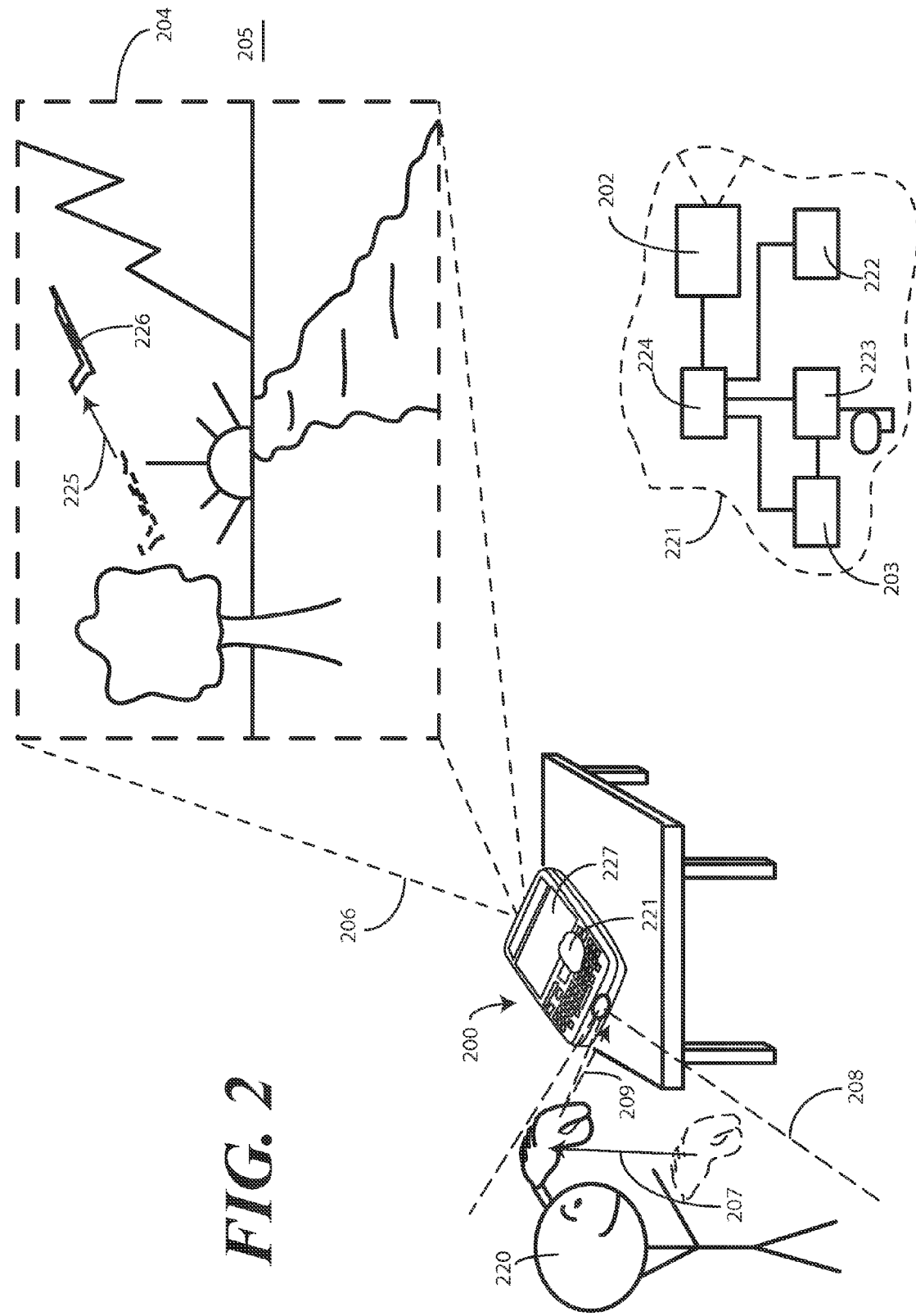
FIG. 2 illustrates one method of controlling a projector in accordance with one or more embodiments of the invention.

Turning now to FIG. 2, illustrated therein is a user 220 employing a portable image projection system 200 having both a projector 202 and a gesture recognition device 203 configured in accordance with one or more embodiments of the invention. As shown, the projector 202 and the gesture recognition device 203 are arranged within the housing 201 such that the image cone 206 and the gesture recognition cone 208 exit the housing 201 in different housing hemispheres. A schematic block diagram 221 of the portable image projection system 200 is shown to the side to illustrate one or more of the internal components of the portable image projection system 200. The illustrative portable image projection system 200 is configured as a personal digital assistant, although it will be obvious to those of ordinary skill in the art having the benefit of this disclosure that the portable image projection system 200 can be configured in a variety of portable and non-portable device configurations. Small, compact projection devices, such as the Pico-P™ scanned laser projectors manufactured by Microvision, Inc. allow projection systems in accordance with some embodiments of the invention to be small, portable, and lightweight.

In this illustrative embodiment, the portable image projection system 200 comprises a projector 202 having one or more light sources configured to deliver one or more light beams to a spatial light modulator. The spatial light modulator is then configured to produce an image 204 on a projection surface 205. The image 204 can be a still image or a video image. The image 204 can be recorded imagery stored in memory 222, such as photographs, computerized tomography scans, or recorded video. Alternatively, the image 204 can be generated or synthesized content, such as computer-generated graphics, or streaming video or images.

For illustration purposes, some embodiments of the projector 202 described herein will be configured as laser-based systems, such as a micro-electro mechanical system (MEMS)-based projector that includes an electromagnetic driver and one or more resonating mirrors or spatial light modulators. The Pico-P™ scanned laser projector manufactured by Microvision, Inc., is one such suitable projector 202. However, it will be clear to those of ordinary skill in the art that embodiments of the invention are not so limited. Laser-based scanning mirror systems described herein may be substituted with other types of projection systems, such as a digital light projection systems or liquid crystal on silicon systems using any of light emitting diode light sources, laser light sources, color filters, and so forth. The projector 202 may be any type of projector suitable for inclusion in a portable, hand-held electronic device. For example, in one embodiment, the image projector 202 is configured as a small, light, battery-operated projector.

The gesture recognition device 203 is configured to generate the gesture recognition cone 208. In the illustrative embodiment of FIG. 2, the gesture recognition cone 208 is formed by an infrared light source configured to project infrared beams. A detector 223 receives reflections 209 of the gesture recognition cone 208. Examples of suitable detectors 223 include a charge-coupled device or a CMOS-photodetector. Upon receiving the reflections 209, the detector 223 can then generate signals for a control circuit 224. Since the gesture recognition cone 208 comprises light from an infrared light source in this illustrative embodiment, the reflections 209 comprise non-visible light. In one embodiment, the infrared light used to create the gesture recognition cone can be coded in accordance with a unique identification function. In one embodiment, the unique identification function comprises a predetermined number of infrared light source pulses per unit time. For example, the predetermined number of infrared light source pulses per unit time can comprise a prime number of pulses per second. When used in a system having multiple gesture recognition cones, each gesture recognition cone can be coded uniquely so that the reflections can be distinctly identified.

The control circuit 224 is operable with both the projector 202 and the gesture recognition device 203. For example, the control circuit 224 can control the one or more light sources and the light modulator to alter the image 204 as a function of input signals from the gesture recognition device 203 corresponding to gestures 207 from the user 220. In this illustration, the user 220 is making a gesture 207 to control the flight 225 of an airplane 226 in the image 204. The control circuit 224 can be any of a microprocessor, programmable logic, an application specific integrated circuit, or other device. The control circuit 224 can be one microprocessor, or multiple devices working in tandem.

While control of an image component, i.e., the airplane 226, is one alteration of the image 204 that can be accomplished with embodiments of the invention, others can as well. For example, in one embodiment the control circuit can be 224 can be configured to alter the image 204 by cropping in response to user input. In another embodiment, the control circuit 224 can scale the image 204 in response to user input. In yet another embodiment, the control circuit 224 can translate the image 204. As shown in FIG. 1, a cursor (112) can be controlled. Of course, combinations of these may be employed. Further, this list is illustrative only and is not intended to be limiting in that those of ordinary skill in the art having the benefit of this disclosure that numerous other image alteration techniques can be used with the embodiments disclosed herein.

In one embodiment, the control circuit 224 is configured to present an optional gesture recognition user interface on a display 227 of the portable image projection system 200. The user 220 can use the user interface selectively turn ON and OFF the gesture recognition feature. Where the gesture recognition user interface is included, it permits gesture recognition device 203 to remain OFF until needed, thereby conserving power.

Figure 3:
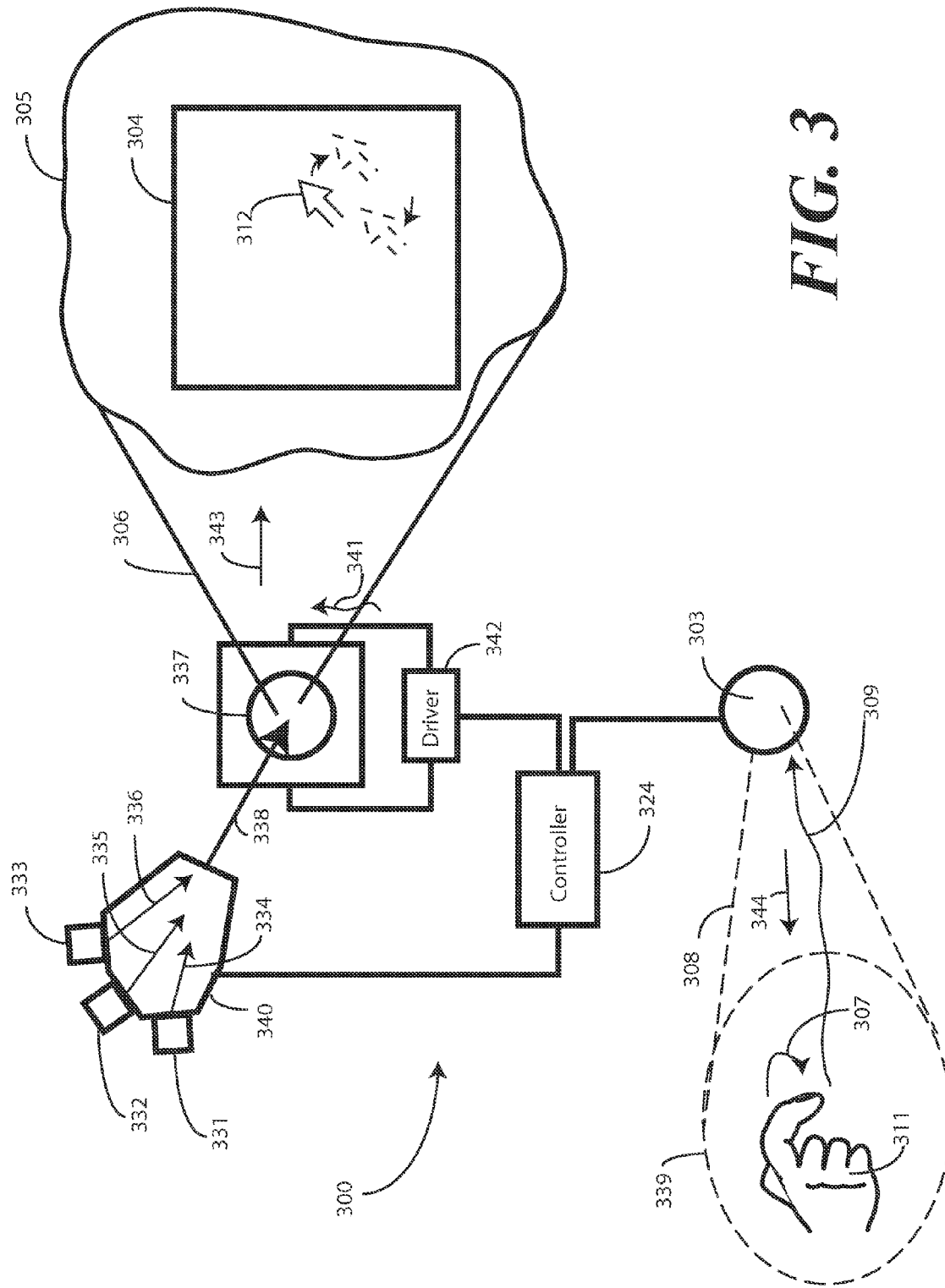
FIG. 3 illustrates a schematic block diagram of one explanatory imaging system configured in accordance with one or more embodiments of the invention.

Turning now to FIG. 3, illustrated therein is a schematic block diagram of one embodiment of an imaging system 300 configured in accordance with one or more embodiments of the invention. The imaging system 300 includes one or more light sources 331,332,333 that are configured to produce one or more light beams 334,335,336. In one embodiment, the one or more light sources 331,332,333 are laser light sources, such as those created by semiconductor laser sources. In the illustrative embodiment of FIG. 3, the one or more light sources 331,332,333 comprise a red light source, a green light source, and a blue light source. A spatial light modulator 337 scans or otherwise modulates the light 338 to produce images 304 on a projection surface 305. A beam combiner 340 combines the output of the light sources 331,332,333 to produce the combined beam of light 338. An optional collimation or focusing optical element may be included between the light sources 331,332,333 and the spatial light modulator 337.

The spatial light modulator 337 is configured to produce the image 304 in this embodiment by scanning the combined beam of light 338 along the projection surface 305, which may be a wall, screen, or other surface. The spatial light modulator 337, which may be a scanning mirror or other modulation device, is operable with and responsive to the control circuit 324. In one embodiment, the spatial light modulator 337 receives the combined beam of light 338 and deflects in response to a drive signal 341 from a driver 342 that is operable with the control circuit 324. This pivoting action scans the combined beam of light 338 within the image cone 306 extending in a first direction 343 to form the image 304. In one embodiment, the scan occurs horizontally and vertically in a raster pattern.

The gesture recognition device 303 of this illustrative embodiment is a camera. While a camera is used as an explanatory gesture recognition device 303, it will be clear to those of ordinary skill in the art having the benefit of this disclosure that embodiments of the invention are not so limited and that other devices could be used as the gesture recognition device 303 instead of a camera. For example, a thermal imager, such as those manufactured by FLIR Systems, Inc., can be used to sense radiated emissions returned from the user as input signals to detect gestures. Alternatively, a sonar, acoustic Doppler detector, or other sound-based detector could be used as well.

The camera takes images 339 within a predetermined field of view defined by the gesture recognition cone 308 extending in a second direction 344 that is different from, and non-overlapping with, the first direction 343. For example, the second direction 344 can be substantially orthogonal with the first direction 343, or can form either a non-overlapping acute or non-overlapping obtuse angle with the first direction 343. By comparing successive images captured by the camera, the control circuit 324 can detect gestures 307 made by the user 311.

The camera captures reflections 309 from the user 311 in the form of images. The camera can convert the images into analog or digital signals indicative of, for example, location and intensity. The signals are then delivered to the control circuit 324. In one embodiment, the camera can include a filter configured to keep the signal to noise ratio within a predetermined limit.

In one embodiment, control circuit 324 can then use the reflections 309 as an input to control the imaging system 300. Illustrating by example, in one embodiment a user may make hand gestures 307 or other motions within the gesture recognition cone 308. The control circuit 324 can be configured with executable instructions configured as software or firmware to recognize the gestures 307 as control signals. These control signals can be used to move, for example, a cursor 312 within the image 304. Such movement would be useful in making a presentation, as the presented would be able to make the gestures 307 within the gesture recognition cone 308 that is non-overlapping with the image cone 306, thereby preventing the addition of shadows or other unnecessary artifacts from appearing in the image 304 being viewed by the audience. Moreover, by making gestures in the non-overlapping gesture recognition cone 308, the user 311 can watch the screen simultaneously, and thus instantly know where his hand, and the corresponding cursor 312, are simply by looking at the image 304. Note that while a user's hand is one object suitable for control, it will be clear those of ordinary skill in the art having the benefit of this disclosure that embodiments of the invention are not so limited. Rather than a hand, control could be implemented by moving a stylus, pointer, or other object within the gesture recognition cone 308. Further, such objects could be configured with reflective layers so as to be more distinguishable to the gesture recognition device 303.

The embodiment of FIG. 3 can also be expanded in other ways. Where, for example, the control circuit 324 is applying amplitude modulation to the light sources 331,332,333 to create video, the gestures 307 can be used to alter the video content. Where, for example, the video content was an animation of a bear walking through the woods, the gestures 307 could cause the bear to move. Numerous other extensions of embodiments of the invention will be readily apparent to those of ordinary skill in the art having the benefit of this disclosure.

Figure 4:
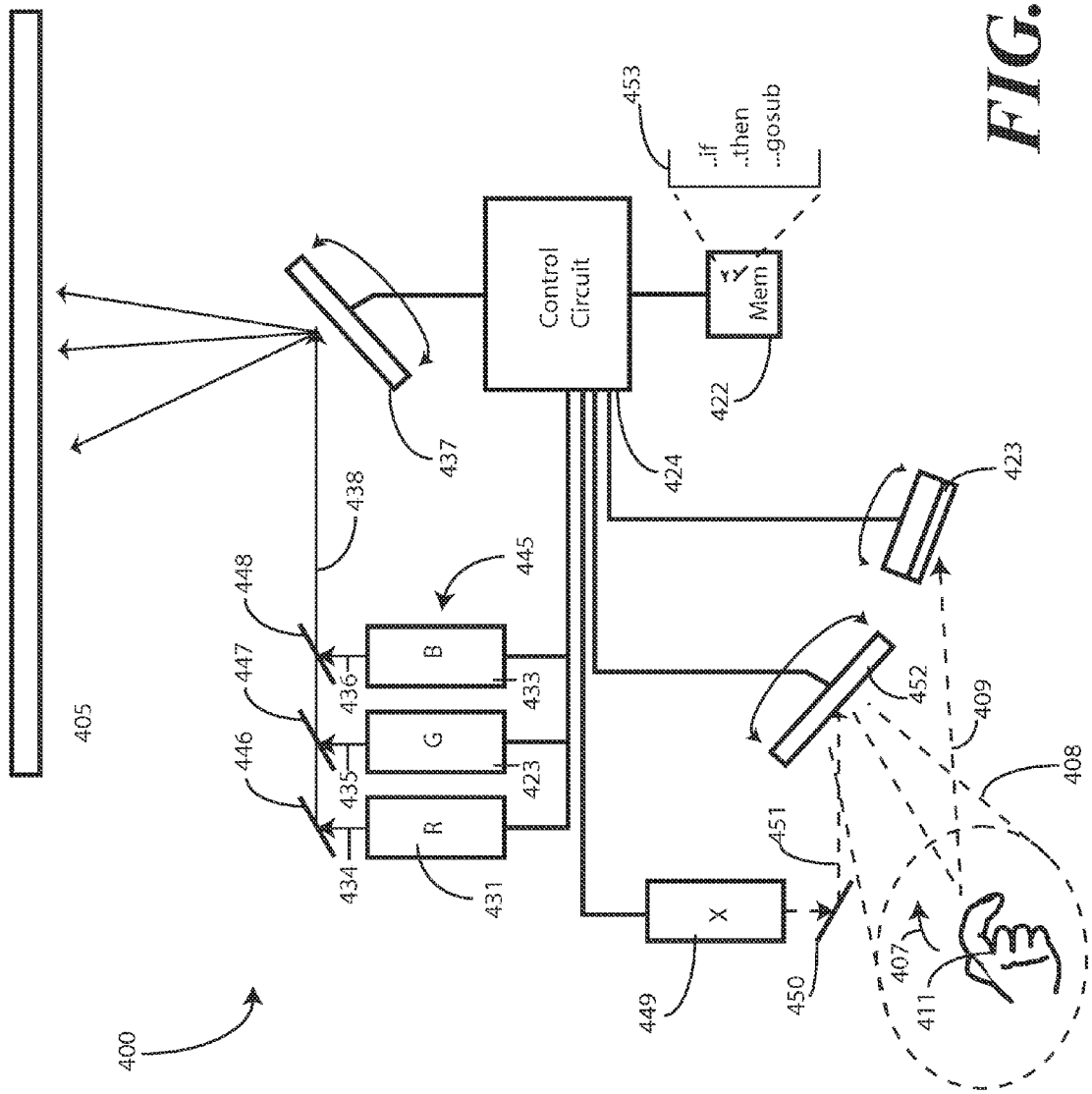
FIG. 4 illustrates another explanatory embodiment of an imaging system configured in accordance with one or more embodiments of the invention.

Turning now to FIG. 4, illustrated therein is a schematic block diagram of an alternate embodiment of an imaging system 400 configured in accordance with embodiments of the invention. FIG. 4 illustrates a general block diagram of a scanned image projection system, with one or more laser sources 445 configured to produce a plurality of light beams. In one embodiment, the one or more laser sources 445 comprise a red laser 431, a blue laser 432, and a green laser 433, as indicated by the "R," "G," and "B." The lasers can be any of various types of lasers. For example, in one embodiment, each laser source 445 is a semiconductor laser, such as an edge-emitting laser or vertical cavity surface emitting lasers. Such semiconductor lasers are well known in the art and are commonly available from a variety of manufacturers.

A spatial light modulator 437 is then configured to produce images by spatially encoding the light from the laser sources 445 along a projection surface 405. In one embodiment, the spatial light modulator 437 comprises a Micro-Electro-Mechanical-System (MEMS) scanning mirror, such as those manufactured by Microvision, Inc. Examples of MEMS scanning mirrors, such as those suitable for use with embodiments of the present invention, are set forth in commonly assigned U.S. patent application Ser. No. 11/786,423, filed Apr. 10, 2007, entitled, "Integrated Photonics Module and Devices Using Integrated Photonics Module," which is incorporated herein by reference, and in U.S. Published patent application Ser. No. 10/984,327, filed Nov. 9, 2004, entitled "MEMS Device Having Simplified Drive," which is incorporated herein by reference. While a scanning mirror is one type of spatial light modulator suitable for use with embodiments of the invention, it will be clear to those of ordinary skill in the art having the benefit of this disclosure that the invention is not so limited. Other types of spatial light modulators, such as a spinning wheel found in digital light projection technology systems, can also be used.

To permit the designer to orient the one or more laser sources 445 in various ways relative to the spatial light modulator 437, one or more optical alignment devices 446,447,448 may optionally be used to direct light beams 434,435,436 from the one or more laser sources 445 to the spatial light modulator 437. For example, the one or more optical alignment devices 446,447,448, in one embodiment, are used to orient the plurality of light beams 434,435,436 into a single, collimated light beam 438. Where the one or more laser sources 445 comprise a red laser 431, blue laser 432, and green laser 433, the one or more optical alignment devices 446,447,448 can blend the output of each laser to form a collinear beam of light.

In one embodiment, dichroic mirrors are used as the one or more optical alignment devices 446,447,448. Dichroic mirrors are partially reflective mirrors that include dichroic filters that selectively pass light in a narrow wavelength bandwidth while reflecting others. In one embodiment, polarizing coatings can be incorporated into the dichroic mirrors as well. Dichroic mirrors and their use in laser-based projection systems are known in the art and, as such, will not be discussed in further detail here. Note that the location, as well as the number, of the optical alignment devices 446,447,448 can vary based upon application. For example, in some MEMS-type scanning systems, the plurality of light beams 434,435,436 can be delivered directly into the spatial light modulator 437. Alternatively, some applications may not require optical alignment devices 446,447,448.

An additional light source 449, which in one embodiment is a non-visible light source, is co-located with the laser sources 445. In the illustrative embodiment of FIG. 2, the additional light source 449 can be, for example, an infrared light source or an ultraviolet light source. As with the laser sources 445, the additional light source 449 can be a semiconductor light source such as a light emitting diode. One example of a non-visible light source suitable for use as the additional light source 449 is an infrared light emitting diode having a wavelength of around 800-810 nanometers. Another example of a non-visible light source suitable for use as the additional light source 449 is an ultraviolet light emitting diode having a wavelength of around 400-410 nanometers. It will be clear to those of ordinary skill in the art having the benefit of this disclosure that the invention is not so limited, as any number of other non-visible light sources or visible light sources can be used as the additional light source 449 as well. Where necessary, an additional optical alignment device 450 can be used to orient the additional light beam 451. A separate spatial light modulator 452 is then able to modulate or encode the additional light beam 451 to form the gesture recognition cone 408.

A sensor 423 is then configured to receive reflections 409 of at least some of a portion 410 of the gesture recognition cone 408 and create electrical signals corresponding to the reflection intensity, location, or other data as sensed by a detector in the sensor 423. In one embodiment, the sensor 423 is configured as a charge coupled device photodetector. In another embodiment, the sensor 423 is configured as a CMOS photodetector. Other types of sensors may also be used. The sensor 423 effectively captures an "image" of the reflection 409 from the user 411 delivers a corresponding signal to the control circuit 424.

The control circuit 424, which may be a microcontroller, a microprocessor, ASIC, logic chip, or other device, serves as the brain of the imaging system 400. The control circuit 424 can include other processing units dedicated to performance of specific functions. For example, an integrated or stand-alone digital signal processor may handle the processing of incoming communication signals or data. In the illustrative embodiment of FIG. 4, the control circuit 424 is shown for simplicity as an integrated circuit, but shall be understood to be representative of any processing architecture known to those skilled in the art.

The control circuit 424 can be a single processor, such as a microprocessor integrated circuit, or alternatively may comprise one or more processing units or components. The control circuit 424 is coupled to a memory 422 or other computer readable medium. By executing operable code 453 stored in the memory 422, the control circuit 424 is capable of causing the various components of the imaging system 400 to execute their respective functions.

In one embodiment, the control circuit 424 executes operable code 453 comprising one or more routines stored in the memory 422. The memory 422 may comprise a separate and distinct integrated circuit connected and operable with the control circuit 424 via a data bus. Further, the memory 422 may include one or more read-only memories, dynamic or static random-access memory, or any other type of programmable memory, such as one or more EPROMs, EEPROMs, registers, and the like. In some embodiments, the memory 422 can comprise non-traditional storage devices as well. The routines stored in the memory 422 can be stored in the form of executable software, firmware, or in any other fashion known to those skilled in the art.

In one embodiment, the control circuit 424 is configured to use the reflections 409 as input for controlling the imaging system 400. A user may make hand gestures 407 or other motions within the gesture recognition cone 408, which causes reflections 409 from the user's hand or other objects to reflect to the sensor 423. The operable code 453 in the memory 422 can instruct the control circuit 424 to recognize the gestures 407 as control signals. As described above, these control signals can be used to move a cursor within an image, or to control content of images being displayed on the projection surface 405.

Figure 5:
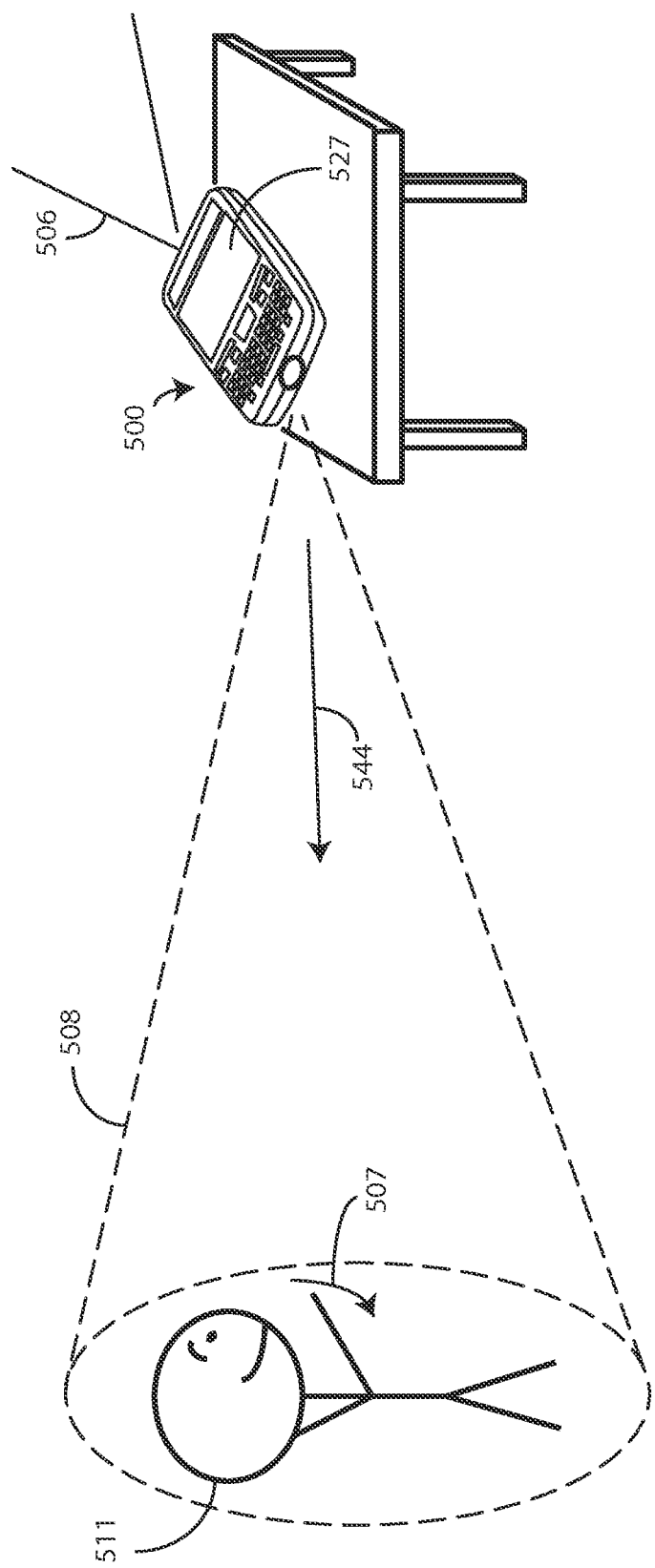
FIG. 5 illustrates an imaging system having a user-specified gesture recognition cone in accordance with one or more embodiments of the invention.

Turning now to FIG. 5, illustrated therein is one explanatory use case suitable with an imaging system 500 configured in accordance with embodiments of the invention. As with embodiments described above, the imaging system 500 of FIG. 5 includes a projector operable to create images with an image cone 506 and a gesture recognition device operable to detect gestures 507 in a gesture recognition cone 508 that is non-overlapping with the image cone 506. A control circuit is also included and is operable with the projector and the gesture recognition device.

In the illustrative embodiment of FIG. 5, the exit direction 544 of the gesture recognition cone 508 is user programmable. Accordingly, the user 511 can program the angle at which the gesture recognition cone 508 exits the housing of the imaging system 500. Accordingly, when the user 511 is making a presentation from a static location, such as behind a lectern, the user 511 may selectively orient the gesture recognition cone 508 to point to the lectern. The user configuration can be selected via a user interface presented on the display 527 of the device.

In still other embodiments, foveated imaging or foveated detection can be used to establish the exit direction 544 of the gesture recognition cone 508. For example, the exit direction 544 of the gesture recognition cone 508 can be steered automatically by a smart tracking mechanism. It can follow the user around while retaining high granularity. In a multi-user or high noise scenario (where a single user is within the gesture recognition cone 508 with other people), the tracking mechanism can be made to depend on additional information as well. In one explanatory embodiment, users can wear uniquely shaped lapel pins or labels and the gesture recognition cone 508 can be pre-programmed to follow a specific shape of the lapel pin or label, or of user wearing the same. In such an embodiment, the gesture recognition cone 508 efficiently tracks the user without continually scanning a large area, and foveates to the user first based on the fiducial/shape for which it is are programmed to look, and second based upon gesture detection around the fiducial upon which they were foveating.

Figure 6:
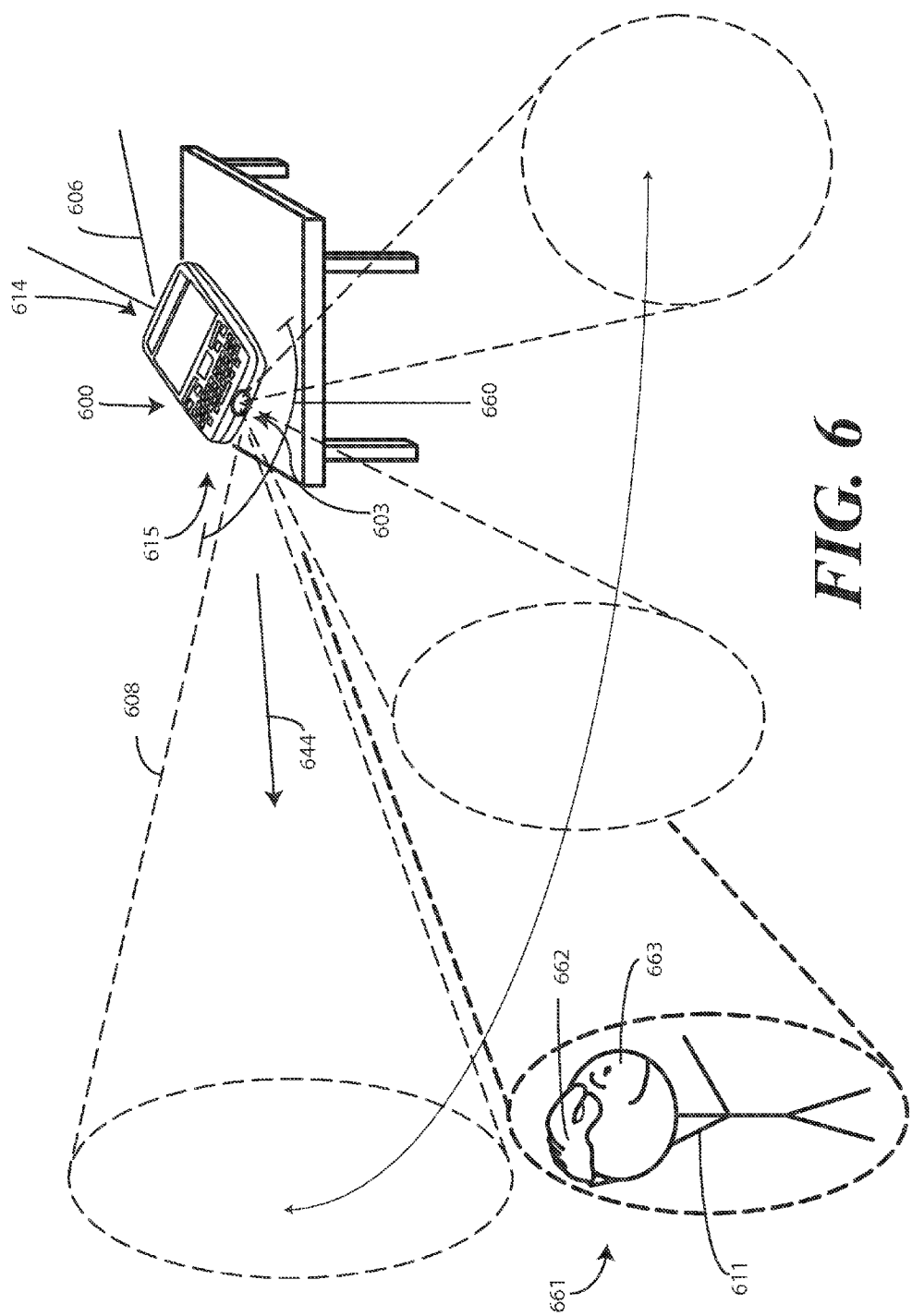
FIG. 6 illustrates a scanning gesture recognition cone and calling gesture in accordance with one or more embodiments of the invention.

Turning to FIG. 6, illustrated therein is an alternate use case suitable with an imaging system 600 configured in accordance with embodiments of the invention. While the use case of FIG. 5 illustrated a gesture recognition cone 508 that was user defined, the embodiment of FIG. 6 employs a gesture recognition cone 608 that scans its gaze to look for gestures.

In the embodiment of FIG. 6, the gesture recognition device 603 is operable to selectively redirect an exit direction 644 of the gesture recognition cone 608 from the housing. This redirection can result in the sweeping action shown in FIG. 6. In one embodiment, the gesture recognition device 603 is configured to redirect the exit direction 644 within a predetermined scanning range 660. In one embodiment, the predetermined scanning range 660 is within a first housing hemisphere 615, while the image cone 606 exits the housing in a second housing hemisphere 614. In this illustrative embodiment, the first housing hemisphere 615 and the second housing hemisphere 614 are different such that the image cone 606 and gesture recognition cone 608 do not overlap.

In the explanatory embodiment of FIG. 6, the control circuit of the imaging system is operable to cause the gesture recognition device 603 to cease redirection of the gesture recognition cone 608 upon a predetermined event happening. For example, the user 611 in FIG. 6 is making a calling gesture 661. The illustrative calling gesture 661 shown is that of the user 611 placing a hand 662 on his head 663. This calling gesture 661 is converted to signal input for the control circuit by the gesture recognition device 603. In response to the calling gesture 661, the control circuit stops the gesture recognition cone 608 so as to be focused upon the user 611. In one embodiment, the control circuit is configured to sweep the gesture recognition cone 608 until a calling gesture 661 is detected. Upon detecting the calling gesture 661, the control circuit can be configured to use predetermined gestures performed within the gesture recognition cone 608 as input to control the projector of the imaging system 600.

Figure 7:
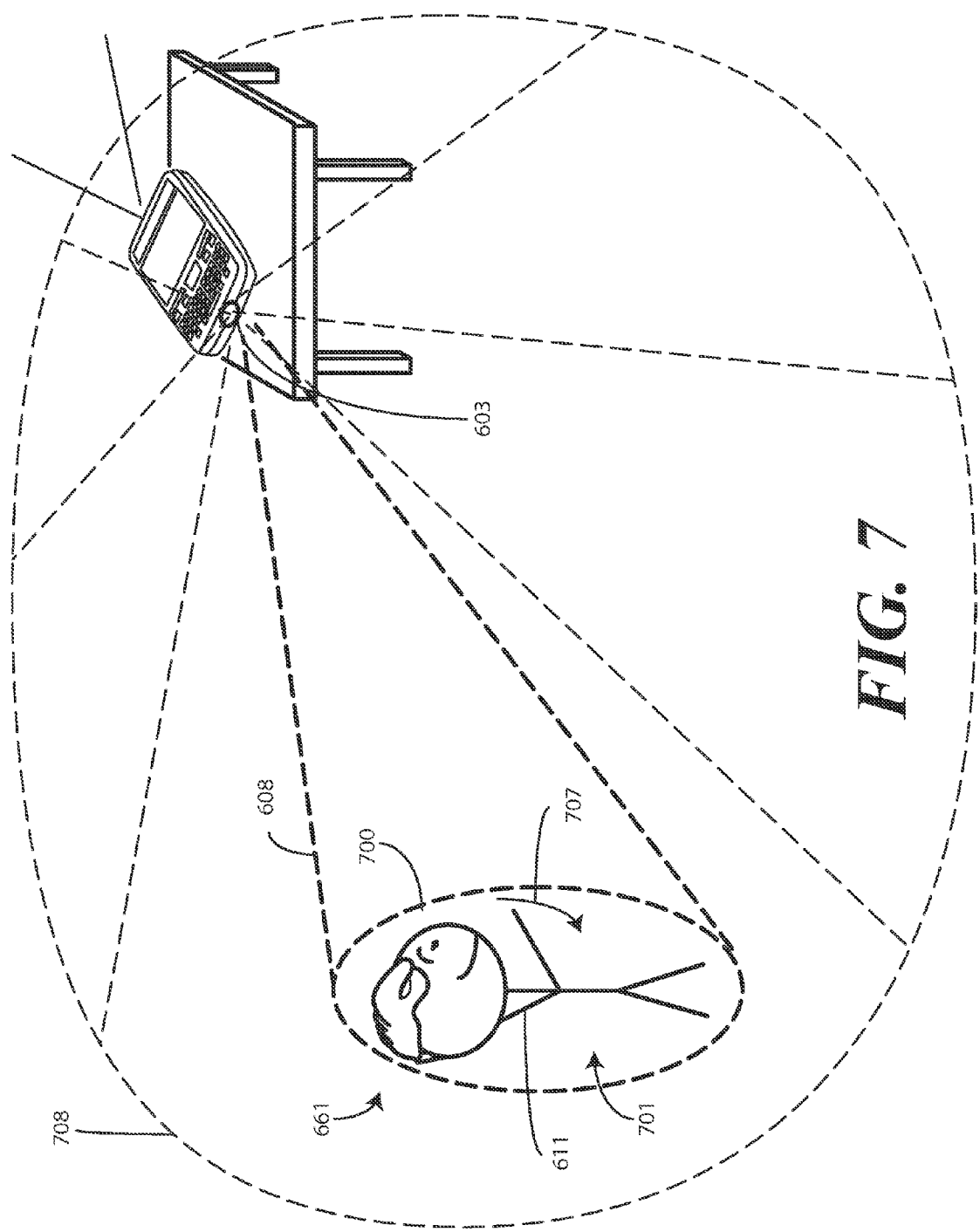
FIG. 7 illustrates a gesture recognition device altering an area of a gesture recognition cone in accordance with one or more embodiments of the invention.

In addition to stopping the redirection of the gesture recognition cone 608, other operations can occur when a calling gesture 661 is detected. Turning now to FIG. 7, illustrated therein is one such example.

In FIG. 7, upon detecting the calling gesture 661, the gesture recognition device 603 is configured to scale a gesture recognition area 700 of the gesture recognition cone 608 to a different size upon detecting the calling gesture 661. For instance, the gesture recognition cone 608 is initially shown as gesture recognition cone 708, which is large and substantially fills the housing hemisphere in which gesture recognition cone 708 exits. Upon detecting the calling gesture 661, in this embodiment the gesture recognition device 603 is operable to reduce the gesture recognition area 770 to be disposed about the user 611. The gesture recognition device 603 can be configured to subsequently scale the gesture recognition cone 608 about a gesture space 701 of the user 611 after detection of the calling gesture 661. For example, it is possible that the gesture recognition device 603 may initially reduce the gesture recognition area 700 too much. As such, clipping may occur when the user's gestures 707 move outside the gesture recognition area 700. Where this was to occur, the gesture recognition device 603 can be configured to expand the gesture recognition area 700 until the clipping ceases.

Combinations of the methods shown in FIGS. 6 and 7 can be employed as well. For example, in one embodiment, the gesture recognition device 603 can be configured to sweep the gesture recognition cone 608 as shown in FIG. 6, and then to stop the sweeping when the calling gesture 661 is detected. The gesture recognition device 603 can also be configured to alter the area of the gesture recognition cone 608 as well. Accordingly, the gesture recognition device 603 can reduce the gesture recognition area 700 of the gesture recognition cone 608, as shown in FIG. 7, in response to ceasing redirection of the gesture recognition cone 608, as shown in FIG. 6. The gesture recognition device 603 can thus initially be in a wide field, low resolution scanning mode. Upon detecting the calling gesture 661, the gesture recognition device 603 can zoom in and capture subsequent gestures 707 with better resolution. Alternatively, the gesture recognition cone 608 can oscillate between two predetermined directions, stopping when the gesture recognition device 603 detects the calling gesture 661. In any of these cases, the gazing field and the variable field of view can be specified and programmed without sensing in other embodiments.

Figure 8:
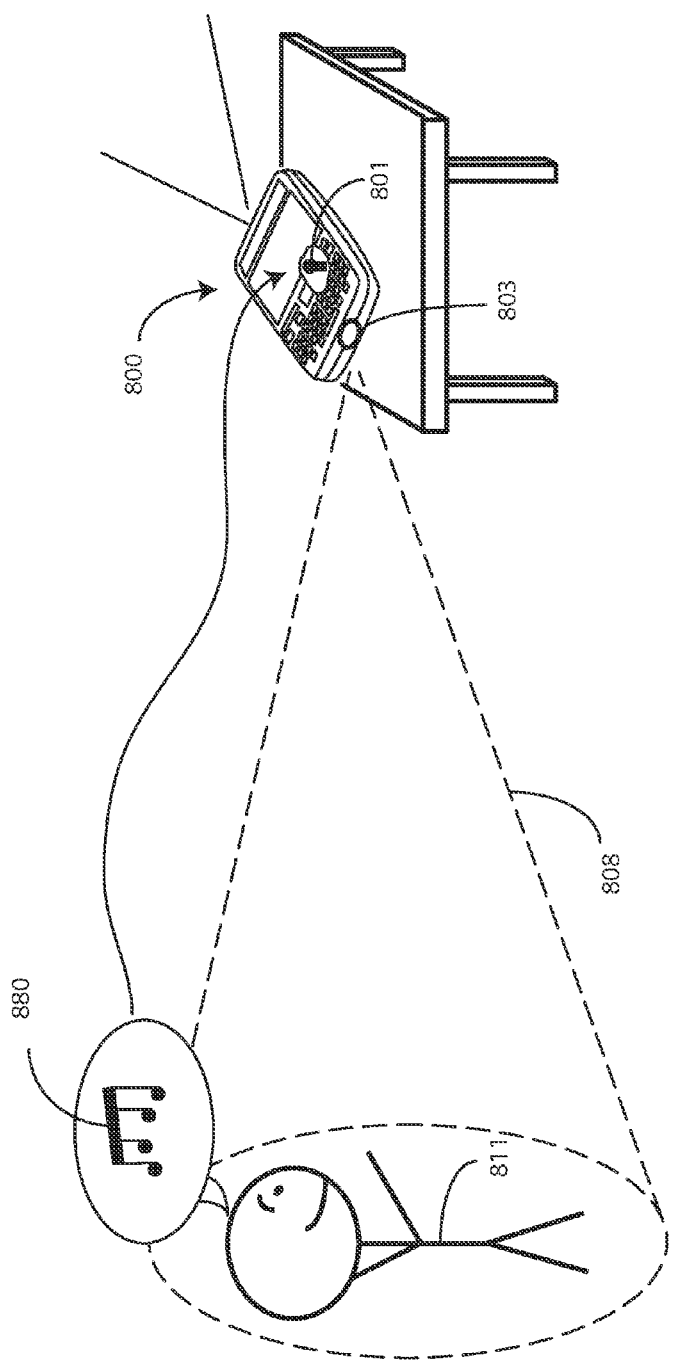
FIG. 8 illustrates an alternate calling gesture in accordance with one or more embodiments of the invention.

Turning now to FIG. 8, illustrated therein is an imaging device 800 having a directional microphone 801 integrated with the gesture recognition device 803. In such an embodiment, the user 811 is able to use sound 880 as the calling gesture. For example, the user 811 can whistle to call the gaze of the gesture recognition cone 808. Thus, the whistle becomes the calling gesture, rather than the user 811 making a motion.

Figure 9:
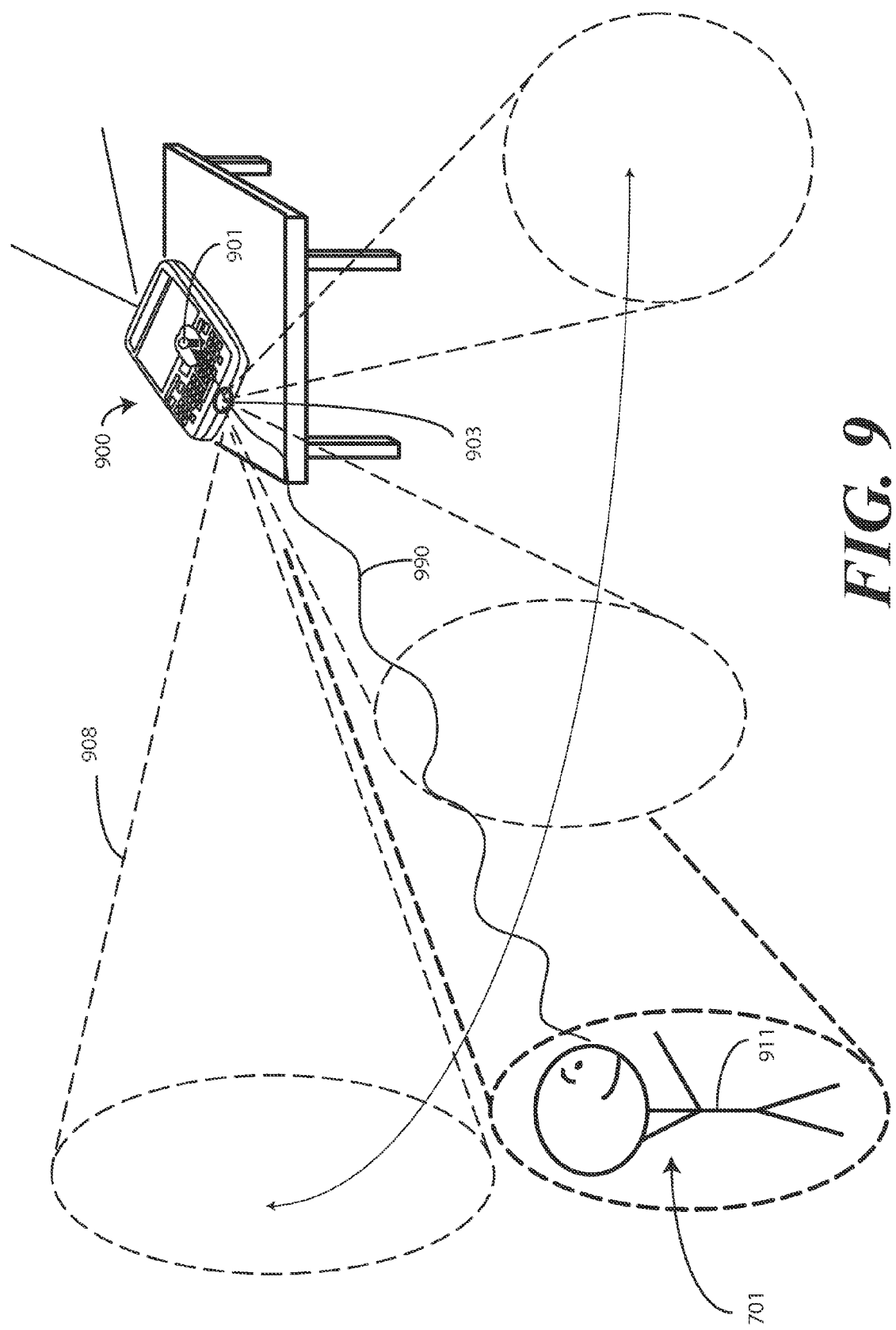
FIG. 9 illustrates a scanning gesture recognition cone and calling gesture in accordance with one or more embodiments of the invention.

Turning now to FIG. 9, illustrated therein is an imaging device 900 having a thermal sensor 901 integrated with the gesture recognition device 903. In such an embodiment, the user's body heat 990 serves as a calling gesture. When the user 911 simply stands within an area passed by the sweeping gesture recognition cone 908, the gesture recognition device 903 is operable to cease redirection of the gesture recognition cone 908 upon detecting the thermal signal of the user's body heat. In one embodiment, the gesture recognition device 903 is further configured to reduce a gesture recognition area 700 of the gesture recognition cone 908 in response to ceasing redirection of the gesture recognition cone 908 and/or scale the gesture recognition cone 908 about a gesture space of the user 911 after detection of the thermal signal.

Figure 10:
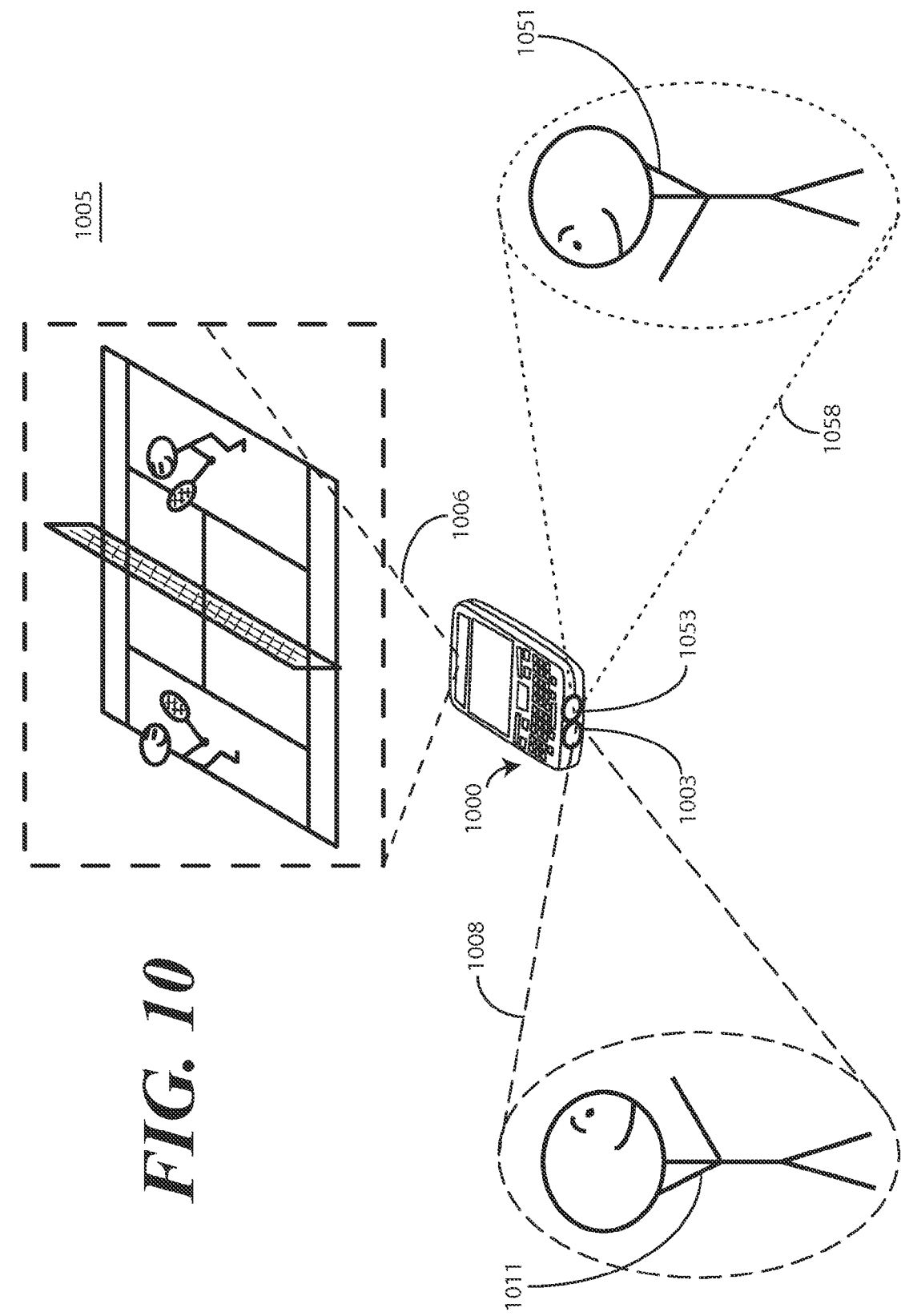
FIG. 10 illustrates an imaging system having a plurality of gesture recognition cones in accordance with one or more embodiments of the invention.

Turning now to FIG. 10, illustrated therein is an imaging device 1000 having a first gesture recognition device 1003 and a second gesture recognition device 1053 disposed within the housing and operable with a control circuit. The first gesture recognition device 1003 is configured to detect gestures in a first gesture recognition cone 1008, while the second gesture recognition device 1053 detects gestures in a second gesture recognition cone 1058. In one embodiment, the first gesture recognition cone 1008 is non-overlapping with the second gesture recognition cone 1058.

In this example, a first user 1011 and a second user 1051 are playing a game, the progress of which is presented on the projection surface 1005 by the image cone 1006. In this example, the game is a video tennis game. By detecting gestures in each gesture recognition cone 1008,1058, each user 1011,1051 can control a corresponding character in the tennis game by making gestures. Note that the same game could be played with a single gesture recognition device that sweeps a gesture recognition cone back and forth about the two users 1011,1051 to detect their control motions as well.

As set forth herein, an imaging system includes a projector that is operable to create images with an image cone. A gesture recognition device is operable to detect gestures in a gesture recognition cone that is non-overlapping with the image cone. A control circuit is operable, in one embodiment, to sweep the gesture recognition cone until a calling gesture is detected. Upon detecting the calling gesture, predetermined gestures performed within the gesture recognition cone can be used as input to control the projector. The control circuit can scale the gesture recognition area of the gesture recognition cone to a different size upon detecting the calling gesture. For example, the control circuit can cause the gesture recognition device to reduce a gesture recognition area of the gesture recognition cone upon receiving input from the gesture recognition device indicating a calling gesture. This reduction can be limited based upon predefined criteria. For example, the reduction of the gesture recognition area can be limited when the control circuit receives another input from the gesture recognition device indicating gesture clipping in the gesture recognition area. In one embodiment, the gesture recognition cone comprises scanned, non-visible light so as not to interfere with images created by the image cone.

Note that while a single imaging device is shown in FIG. 10, it will be clear to those of ordinary skill in the art having the benefit of this disclosure that each user can use a separate electronic device, with those devices communicating gaming or other commands via a wireless network such as WiFi, Bluetooth, 3G protocols, and so forth. A plurality of such devices can be networked to form a large mesh of devices, gesture detection cones, and gesture controls.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. An imaging system, comprising:
    a housing;
    a control circuit disposed within the housing;
    a projector disposed within the housing and operable with the control circuit, the projector being configured to create images with an image cone; and
    a gesture recognition device disposed within the housing and operable with the control circuit, the gesture recognition device being configured to detect gestures in a gesture recognition cone;
    wherein the projector and the gesture recognition device are arranged within the housing such that the image cone and the gesture recognition cone exit the housing without overlap.

2. The imaging system of claim 1, wherein the projector and the gesture recognition device are arranged within the housing such that the image cone and the gesture recognition cone exit the housing in different housing hemispheres.

3. The imaging system of claim 1, wherein the gesture recognition device is operable to selectively redirect an exit direction of the gesture recognition cone from the housing within a predetermined scanning range.

4. The imaging system of claim 3, wherein:
    the predetermined scanning range is within a first housing hemisphere;
    the image cone exits the housing in a second housing hemisphere; and
    the first housing hemisphere and the second housing hemisphere are different.

5. The imaging system of claim 3, wherein the control circuit is operable to cause the gesture recognition device to cease redirection of the gesture recognition cone upon receiving input from the gesture recognition device indicating a calling gesture.

6. The imaging system of claim 5, wherein the calling gesture comprises a user placing a hand on a head.

7. The imaging system of claim 5, wherein the gesture recognition device is operable to reduce a gesture recognition area of the gesture recognition cone in response to ceasing redirection of the gesture recognition cone.

8. The imaging system of claim 7, wherein the gesture recognition device is further operable to scale the gesture recognition cone about a gesture space of a user after detection of the calling gesture.

9. The imaging system of claim 3, further comprising a second gesture recognition device disposed within the housing and operable with the control circuit, the second gesture recognition device being configured to detect gestures in a second gesture recognition cone that is non-overlapping with the gesture recognition cone.

10. The imaging system of claim 3, wherein the gesture recognition device comprises a camera.

11. The imaging system of claim 3, wherein the gesture recognition device comprises a thermal sensor.

12. The imaging system of claim 3, wherein the gesture recognition device comprises a directional microphone.

13. The imaging system of claim 3, wherein the gesture recognition device comprises:
   a non-visible light source operable to produce a non-visible light beam;
   a light modulator operable to scan the non-visible light beam to form the gesture recognition cone; and
   a sensor configured to receive reflections, emissive patterns, or dispersive patterns of the non-visible light beam;
   wherein the control circuit is operable to use signals corresponding to the reflections, emissive patterns, or dispersive patterns as an input to control the projector.

14. The imaging system of claim 13, wherein the non-visible light source comprises an infrared light source.

15. The imaging system of claim 13, wherein the projector comprises:
   one or more light sources configured to produce one or more light beams; and
   another light modulator configured to produce the images on a projection surface by scanning the one or more light beams within the image cone.

16. The imaging system of claim 1, wherein the control circuit is operable to cause the gesture recognition device to reduce a gesture recognition area of the gesture recognition cone upon receiving input from the gesture recognition device indicating a calling gesture.

17. The imaging system of claim 16, wherein reduction of the gesture recognition area is limited when the control circuit receives another input from the gesture recognition device indicating gesture clipping in the gesture recognition area.

18. An imaging system, comprising:
   a projector operable to create images with an image cone;
   a gesture recognition device operable to detect gestures in a gesture recognition cone that is non-overlapping with the image cone; and
   a control circuit, operable with the projector and the gesture recognition device;
   wherein the control circuit is operable to sweep the gesture recognition cone until a calling gesture is detected; and
   upon detecting the calling gesture, using predetermined gestures performed within the gesture recognition cone as input to control the projector.

19. The imaging system of claim 18, wherein the control circuit is operable to scale a gesture recognition area of the gesture recognition cone to a different size upon detecting the calling gesture.

20. The imaging system of claim 18, wherein the control circuit is configured to electronically communicate the calling gesture to a remote device.

* * * * *